United States Patent
Appelman

(10) Patent No.: US 7,031,698 B1
(45) Date of Patent: Apr. 18, 2006

(54) COMMUNICATING FORWARDING INFORMATION FOR A COMMUNICATIONS DEVICE BASED ON DETECTED PHYSICAL LOCATION

(75) Inventor: Barry Appelman, Great Falls, VA (US)

(73) Assignee: America Online, Inc., Dulles, VA (US)

( * ) Notice: Subject to any disclaimer, the term of this patent is extended or adjusted under 35 U.S.C. 154(b) by 515 days.

(21) Appl. No.: 10/158,183

(22) Filed: May 31, 2002

(51) Int. Cl.
*H04M 3/42* (2006.01)

(52) U.S. Cl. ................. 455/417; 455/414.1; 455/456.1

(58) Field of Classification Search ............. 455/456.3, 455/456.1, 556.1, 575.6, 417, 419, 420, 414.1
See application file for complete search history.

(56) References Cited

U.S. PATENT DOCUMENTS

| | | | |
|---|---|---|---|
| 5,315,636 A | 5/1994 | Patel | |
| 5,673,308 A | 9/1997 | Akhavan | |
| 5,946,616 A | 8/1999 | Schornack et al. | |
| 6,002,750 A * | 12/1999 | Ertz | 455/413 |
| 6,038,451 A | 3/2000 | Syed et al. | |
| 6,141,545 A | 10/2000 | Begeja et al. | |
| 6,167,278 A * | 12/2000 | Nilssen | 455/462 |
| 6,199,099 B1 | 3/2001 | Gershman et al. | |
| 6,725,051 B1 * | 4/2004 | Fidler | 455/456.1 |
| 6,731,950 B1 * | 5/2004 | Giles | 455/556.1 |
| 6,735,433 B1 * | 5/2004 | Cervantes | 455/417 |

* cited by examiner

*Primary Examiner*—Joseph Feild
*Assistant Examiner*—Huy Nguyen
(74) *Attorney, Agent, or Firm*—Fish & Richardson P.C.

(57) ABSTRACT

Detecting a physical location change of a mobile communications device may initiate a process to initiate, or cancel, forwarding of future incoming communications to the mobile communications device. Forwarding information for a mobile communications device may be accessed and modified using an interface that communicates using an Internet Protocol network.

24 Claims, 3 Drawing Sheets

COMMUNICATING FORWARDING INFORMATION FOR A COMMUNICATIONS DEVICE BASED ON DETECTED PHYSICAL LOCATION

TECHNICAL FIELD

This description relates to communicating forwarding information for a communications device based on the detected physical location of a communications device.

BACKGROUND

A wide variety of interconnected or independent communications systems exist, such as Internet protocol networks, satellite networks, cellular networks, and land line telephone networks. Many types of communication devices, such as land line telephones, cellular telephones, general-purpose computers (such as personal computers and laptop computers), special purpose computers, and personal digital assistants, are connected to communication systems.

Multiple devices capable of receiving communications may be present in the same general physical location, such as a home or office. A person may prefer receiving an incoming communication on a particular device.

An incoming telephone call may be forwarded from the called telephone number to a different telephone number. Human intervention, however, may be required to establish that incoming calls sent to a particular telephone should be forwarded.

SUMMARY

In one general aspect, a physical location change for a mobile communications device may be detected. Based on a detected placement of the mobile communications device in a cradle associated with the mobile communications device, a process may be initiated to forward future incoming communications directed to that mobile communications device to a second communications device. Based on a detected removal of the mobile communications device from the cradle associated with the mobile communications device, a process may be initiated to cancel forwarding of future incoming communications directed to the mobile communications device.

Implementations may include one or more of the following features. Detecting a physical location change may be performed by the mobile communications device to which the incoming communication is directed or a docking cradle associated with the mobile communications device to which the incoming communication is directed. A cellular telephone is an example of a mobile communications device for which a physical location change may be detected.

The process to initiate, or cancel, forwarding of future incoming communications may be performed by the mobile communications device to which the incoming communication is directed or a docking cradle associated with the mobile communications device to which the incoming communication is directed. The mobile communications device may use a wireless communication pathway or a wireless messaging service to initiate the process. The cradle may use a Internet Protocol network or a wireless communication pathway to initiate the process.

In another general aspect, forwarding information for a mobile communications device may be accessed and modified using an interface provided using an Internet Protocol network. Modification of the forwarding information may include adding, updating, and deleting forwarding information. Forwarding information may be associated with a docking cradle.

Implementations of the techniques discussed above may include a method or process, an apparatus or system, or computer software on a computer-accessible medium.

The details of one or more of the implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Forwarding of future incoming communications to a mobile communications device may be initiated or cancelled based on whether a physical location change of the mobile communications device has been detected. For example, when a mobile communications device, such as a cellular telephone, is placed in its docking cradle, the telephone's physical presence within that docking cradle may be detected automatically and that detected presence may be used as a basis for communicating with a mobile service provider to invoke forwarding of future incoming communications directed to the cellular telephone to another device, such as a predesignated or nearby land line telephone. Similarly, when a mobile communications device is removed from its docking cradle, the lack of physical presence may be detected and used as a basis for communicating with the mobile service provider to cancel forwarding of any future incoming communications directed to the cellular telephone to another device.

Figure 1:
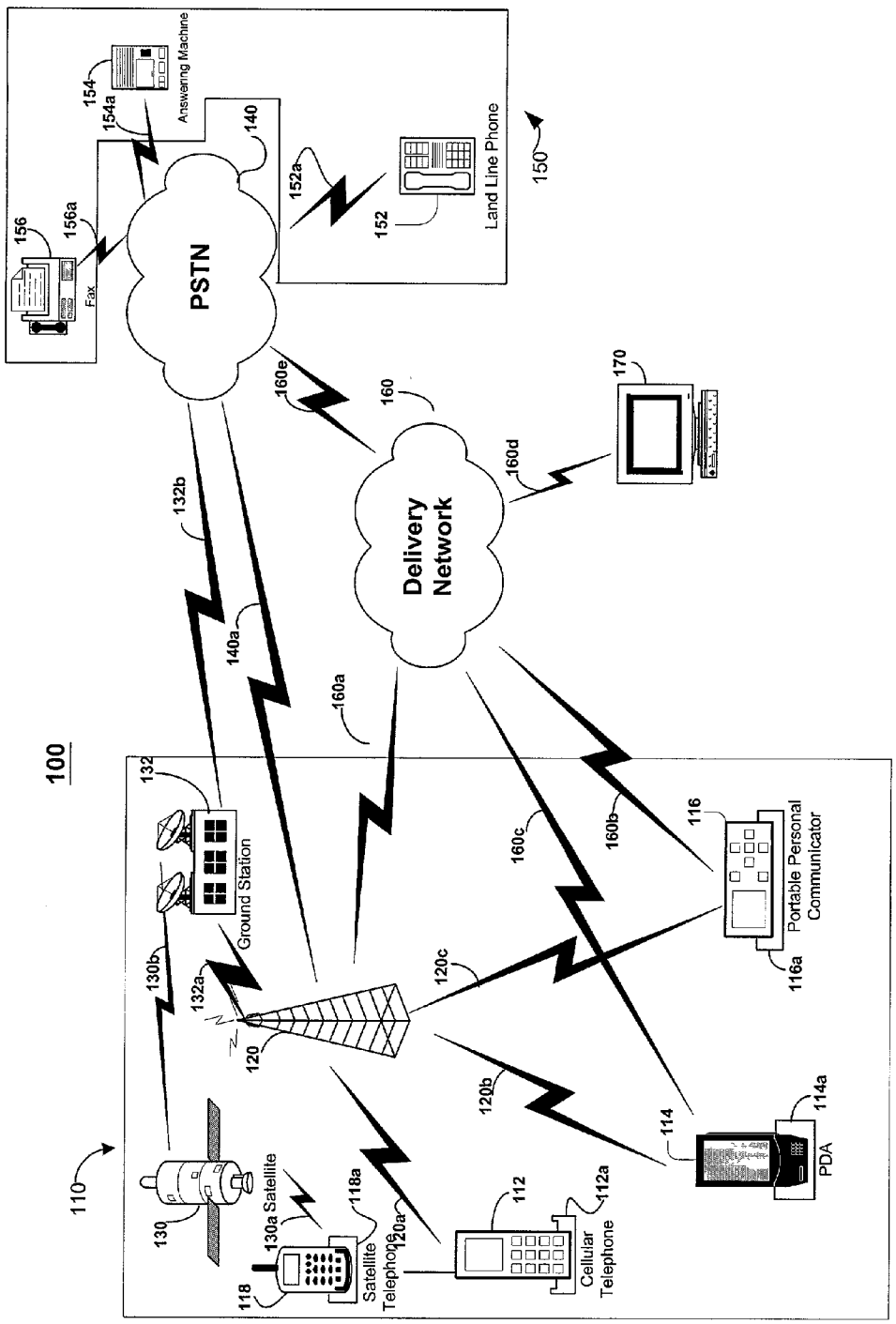
FIG. 1 is a block diagram illustrating a communications system capable of directing communications between mobile communications devices and configured to detect a physical location change of a mobile communications device and initiate forwarding of future incoming calls directed to a mobile communications device based on the physical location change.

For illustrative purposes, FIG. 1 depicts a communications system 100 which is capable of directing communications between mobile communications devices and which is configured to implement techniques for detecting physical location changes and initiating a process to forward, or stop forwarding of incoming communications directed to a mobile communications device. The illustrated communications system 100 may include additional or alternative mobile communications devices that are not shown, or it may include only a subset of the mobile communications devices that are shown.

The communications system 100 includes a wireless over-the-air communication system 110, such as a mobile communications network or a satellite communications network. The wireless communications system 110 may use a cellular tower 120 of a mobile services provider to communicate analog or digital signals 120a–120c between two or more remotely-located devices. The wireless communications system 110 may use any technology, or combination of technologies, for transmitting, including Advanced Cellular telephone System (AMPS), Narrowband Advanced Cellular telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile communications (GSM) or Cellular Digital Packet Data (CDPD).

The mobile devices that communicate using the wireless communication system 110 typically include cellular telephones 112 (shown in an associated docking cradle 112a), personal digital assistants ("PDAs") 114 (shown in an associated docking cradle 114a), and portable personal communicators 116 (such as a mobile communicator) (shown in an associated docking cradle 116a), or other two-way messaging devices that are capable of communicating a variety of content, such as e-mail messages and instant messages. Some mobile devices, such as the cellular telephone 112 or the PDA 114, may be able to receive wireless communications from a cellular tower 120 or a satellite 130. Docking cradles 112a, 114a, 116a and 118a are capable of housing an associated device, and may be capable of detecting physical presence and/or communicating or initiating communication with or through the associated device and/or a mobile service provider. For instance, a docking cradle, such as 112a, 114a, 116a or 118a, may have a physical switch that is flipped by the presence of a mobile device in the docking cradle and released when the mobile device is removed from the docking cradle. A docking cradle may include a wireless communication access mechanism to use to communicate with the mobile service provider, such as a wired or wireless connection to a home network that may be used to send a message to the mobile service provider.

The wireless communication system 110 may use a satellite 130 to enable communications between two or more remotely-located devices. The satellite 130 may communicate with a device, such as a satellite telephone 118 (shown in an associated docking cradle 118a), through signal 130a, or the satellite 130 may communicate indirectly with a particular mobile communications device, such as a cellular telephone 112, PDA 114, or portable personal communicator 116, by communicating signals 130b to a ground station 132 that communicates with the mobile communications devices through other communications networks (such as a cellular tower 120 or the PSTN ("Public Switched Telephone Network") 140.

A wireless communication system 110 may be interconnected with the PSTN 140 through a communication pathway 140a, a telephone system that is capable of connecting a variety of devices through a communications system that directs calls to a particular location, generally using land lines. Devices 150, such as land line telephones 152, answering machines 154, and facsimile or fax machines 156, may be connected to the PSTN 140, typically through a wire or cable connection 152a, 154a, 156a. The land line telephone 152 may include a corded or cordless telephone. A cordless telephone may include a base unit which uses analog or digital signals to communicate with hand units or head sets.

The wireless communication system 110 also may be interconnected with a delivery network 160 through a communication pathway 160a. The delivery network 160 may be capable of enabling communication with devices within wireless communication system 110 indirectly by communicating through cellular tower 120 via communications pathway 160a, or directly via other communication pathways, such as those illustrated by reference numerals 160b and 160c which enable communication with personal portable communicator 116 and PDA 114. Still further, the delivery network 160 may enable communications with devices outside of communications system 110, such as a general-purpose computer 170 (e.g., a personal computer or laptop). The general-purpose computer 170 may be able to receive and transmit telephone calls, for example, by using Voice-over IP ("VoIP") or IP telephony. The communications system 100 also may include other devices (not shown), such as a special-purpose computer (e.g., a device specifically programmed for communications with other special-purpose computers and/or the general-purpose computer) workstation, a server, a device, a component, other physical or virtual equipment, or some combination thereof capable of responding to and executing instructions.

The devices within communications system 110 may be arranged to operate within, or in concert with, one or more other communication systems, such as, for example, one or more LANs ("Local Area Networks") and/or one or more WANs ("Wide Area Networks").

Examples of the delivery network 160 include the Internet, the World Wide Web, WANs, LANs, analog or digital wired and wireless telephone networks (e.g., ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop"), HDSL ("High bit-rate Digital Subscriber Line"), and VDSL ("Very high bit-rate Digital Subscriber Line")), radio, television, cable, satellite, and/or any other delivery mechanism for carrying data. The communications pathways 160a, 160b, 160c, 160d, 160e may enable communications through the one or more delivery networks 160 described above. Each of the communication pathways 160a, 160b, 160c, 160d, 160e may include, for example, a wired, wireless, cable or satellite communication pathway.

In many settings, such as a home or business, more than one communication device is capable of enabling communications. However, depending upon the setting (e.g., time or place), a particular communication device may be preferred for receiving communications in one setting, while another device may be preferred for receiving communications in another setting.

For example, several mobile communications devices (as described with respect to FIG. 1) may be capable of sending and receiving communications in a home, including a land line telephone 152 and a cellular telephone 112. A person, however, may prefer to make and receive telephone calls using a land line telephone 152 when at home, even if incoming calls are directed to the cellular telephone 112 by a caller. In a similar example, a PDA 114 and a general-purpose computer 170 each may be capable of receiving electronic messages, and a person may prefer to receive electronic messages using a general-purpose computer 170 rather than a PDA 114 while at home, even if a sender has directed an electronic message to the PDA 114.

It may be useful to enable communications to be forwarded to an appropriate or desired device automatically based on physical location information. For example, an incoming communication directed to a cellular telephone 112 may be forwarded to a land line telephone 152 if the presence of the cellular telephone 112 is physically detected (e.g., within the docking cradle 112a) at the home, or an incoming communication directed to a PDA 114 may be forwarded to a general-purpose computer 170 if the PDA is physically detected (e.g., within the docking cradle 114a) at the home.

Figure 2:
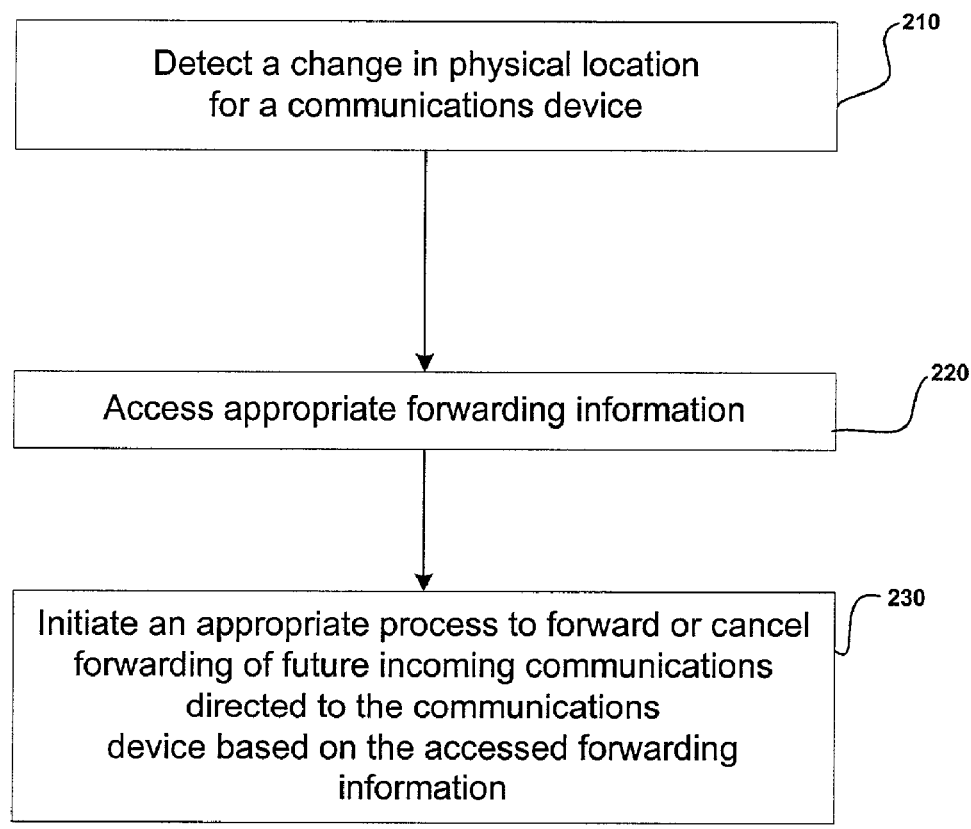
FIG. 2 is a flow chart for detecting a physical location change and initiating forwarding of future incoming calls directed to a mobile communications device based on the physical location change.

Referring to FIG. 2, an exemplary process 200 controls one or more processors to detect a change in physical location for a mobile communications device and initiate or cancel forwarding of future incoming communications to the mobile communications device based on a detected change. The mobile communications device to which the incoming communication is directed may be any portable communication device capable of receiving incoming communications, such as a cellular telephone 112, PDA 114, portable personal communicator 116, or satellite telephone 118 shown by FIG. 1.

The process 200 may performed by the mobile communications device to which the incoming communication is directed (such as a cellular telephone 112, a PDA 114, a portable personal communication 116, or satellite telephone 118 as described with respect to FIG. 1) or by another mobile communications device capable of determining physical location information for the mobile communications device (such as a cellular telephone docking cradle 112a, a PDA cradle 114a, a portable personal communicator cradle 116a, or a satellite telephone cradle 118a).

The process 200 begins by detecting a change in the physical location for a mobile communications device (step 210). A change in the physical location is detected by detecting the physical presence or physical removal of a mobile communications device in a docking cradle (or other physical device). Either of the mobile communications device or its associated docking cradle may be configured to detect such a physical location change. For example, a cellular telephone 112 or a cellular telephone docking cradle 112a may be configured to determine whether the cellular telephone 112 has been placed in the cradle 112a.

If the mobile communications device is used to detect changes in physical presence removal, it may be configured with a physical or electrical switch that detects (e.g., is flipped) the presence of a mobile device in the docking cradle and released when the mobile device is removed from the docking cradle. If the docking cradle performs this function, it may be configured, for example, with a memory processes in firmware to discriminate among several different cellular telephones, for example, by determining a unique number assigned to a cellular telephone, such as an electronic serial number ("ESN") or a mobile identification number ("MIN"). Similarly, a PDA cradle 114a or PDA 114 may be able to determine whether the PDA 114 has been placed in the PDA cradle 114a, a portable personal communicator cradle 116a or portable personal communicator 116 may be able to determine whether the portable personal communicator 116 has been placed in the portable personal communicator cradle 116a, and a satellite telephone cradle 118a or satellite telephone 118 may be able to determine whether the satellite telephone 118 has been placed in the satellite telephone cradle 118a.

By configuring the docking cradle for detecting a change in the physical location for a mobile communications device, this functionality may be enabled without requiring changes to mobile communications devices, such as cellular telephones. In this manner, a less-costly peripheral device, the cradle, may be used to enable the functionality, creating or invigorating a market for such cradle devices. Alternatively, enabling this functionality in the mobile communications device itself may provide a market advantage for certain communication devices.

In response to a detected change in physical location of the mobile communication device (e.g., presence in cradle or removed from cradle), appropriate forwarding information is accessed (step 220). Forwarding information may include information that is needed to access the mobile service provider, such as, for example, an access telephone number or an IP-address for the provider. Information needed to access the mobile service provided may include information associated with the mobile communications device, such as an a personal identification number ("PIN"), account identifier, or password.

Forwarding information also may include information regarding how to initiate or cancel call forwarding, such as a function code or key number sequence that may be used to initiate call forwarding or a function code or key number sequence that may be used to cancel call forwarding.

Forwarding information also may include information regarding where the incoming communications to the mobile communications device should be forwarded, such as a home telephone number for an incoming call directed to a cellular telephone when the cellular telephone is positioned in its cradle at home or a work telephone number for an incoming call directed to a cellular telephone when the cellular telephone is positioned in its cradle at work. Forwarding information may include an electronic address or Instant Message address to which an incoming communication is to be forwarded.

Forwarding information may differ based on the type of mobile communications device to which the communication is directed. Forwarding information for an incoming telephone call to a cellular telephone may include, for example, a telephone number to which an incoming telephone call is to be directed and any additional information that is needed to forward the incoming communication, such as a telephone service access number and a personal identification number. Forwarding information for an electronic message may include a user name and a domain name.

Forwarding information may differ based on the detected location of a mobile communications device (e.g., based on whether the mobile communications device has been placed in, or removed from, an associated docking cradle), and the type of device and means by which the mobile service provider may be contacted.

For example, a cellular telephone automatically may communicate with the mobile service provider by calling the mobile service provider using a wireless communication pathway. Additionally or alternatively, the cellular telephone may communicate with the mobile service provider using a wireless messaging protocol, such as SMS ("Short Message Service") that is a message service available with some GSM mobile communication systems. Using SMS, an alphanumeric message may be sent to a cellular telephone to be displayed, and, as necessary, the message may be buffered by a GSM system until the cellular telephone becomes active.

Still further, the docking cradle may be attached through a wired or wireless communication pathway to an IP network that may be used to communicate with the mobile service provider. For example, the docking cradle may communicate with the mobile service provider through the IP network or the docking cradle may communicate with a device or process on the IP network which communicates with the mobile service provider. The docking cradle may communicate with the mobile service provider by sending an electronic message. Additionally or alternatively, the cellular telephone, PDA, portable personal communicator, or satellite telephone may access the IP network through the associated docking cradle, and may itself communicate with the mobile service provider to effect appropriate call forwarding.

A separate wireless access method also may provide a means of contacting the mobile service provider to initiate, or cancel, call forwarding for a mobile communications device. For example, a cradle may have a telephone number associated with it that may be limited to calling a mobile service provider for the associated mobile communication device to initiate or cancel call forwarding for the mobile communications device.

A PDA or portable personal communicator may communicate to the mobile service provider using a wireless communication pathway or using an IP network that is accessed through an associated docking cradle.

Decision logic for accessing appropriate forwarding information is illustrated in the following table. The table identifies the types of forwarding information to be accessed based on the detected location of a mobile communications device (placed in or removed from an associated cradle) and the type of mobile communications device and means for contacting the mobile service provider, such as a cellular telephone using wireless access or sending a SMS or cradle using IP-access or wireless access.

| Detected changes in location of mobile communications device | Type of device and means of contacting mobile service provider | Appropriate forwarding information to be accessed |
|---|---|---|
| Placed in cradle-contact mobile service provider to initiate forwarding of future incoming calls. | Cellular telephone using wireless access | An access telephone number for mobile service provider, a function code to initiate call forwarding for cellular telephone, and a telephone number to which incoming calls should be forwarded. |
| Placed in cradle-contact mobile service provider to initiate forwarding of future incoming calls. | Cellular telephone sending a SMS | An access telephone number of mobile service provider to send text message, a text message to initiate call forwarding for cellular telephone, and a telephone number to which incoming calls should be forwarded. |
| Placed in cradle-contact mobile service provider to initiate forwarding of future incoming calls. | Cradle using IP-access | An IP-address of mobile service provider, a text message to initiate call forwarding for cellular telephone, and a telephone number to which incoming calls should be forwarded. |
| Placed in cradle-contact mobile service provider to initiate forwarding of future incoming calls. | Cradle using wireless access | A telephone number of call forwarding service (e.g., cradle manufacturer), a telephone number of mobile service provider to send text message, a text message to initiate call forwarding for cellular telephone, and a telephone number to which incoming calls should be forwarded. |
| Removed from cradle-contact mobile service provider to cancel forwarding of future incoming calls. | Cellular telephone using wireless access. | An access telephone number of mobile service provider and a function code to cancel call forwarding for cellular telephone. |
| Removed from cradle-contact mobile service provider to cancel forwarding of future incoming calls. | Cellular telephone using SMS | A telephone number of mobile service provider to send text message and a text message to initiate call forwarding for cellular telephone. |
| Removed from cradle-contact mobile service provider to cancel forwarding of future | Cradle using IP-access | An IP-address of mobile service provider and a text message to cancel call forwarding for cellular telephone. |
| incoming calls. | | |
| Removed from cradle-contact mobile service provider to cancel forwarding of future incoming calls. | Cradle using wireless | An telephone number of call forwarding service (e.g., cradle manufacturer), a telephone number of mobile service provider to send text message, and a text message to cancel call forwarding for cellular telephone. |

Appropriate forwarding information may be accessed by using a delivery network 160 (as described above with respect to FIG. 1), such as an IP network, or forwarding information may be stored in the mobile communications device or a docking cradle associated with the mobile communications device. The data stored for a particular cellular telephone may be, for example, the mobile service provider telephone number, the function code to initiate call forwarding, the function code to cancel call forwarding, and a telephone number to which future incoming calls should be forwarded when call forwarding has been initiated. If forwarding information is not stored in the cellular telephone, a unique identifier for the cellular telephone, such as the cellular telephone number, an ESN, or a MIN may be used.

The processor initiates an appropriate process to have the mobile service provider forward, or cancel forwarding of, any incoming communications directed to the mobile communications device based on the assessed forwarding information (step 230). For example, when a cellular telephone has been placed in an associated cradle, the cellular telephone calls the mobile service provider, sends a function code to initiate call forwarding, and sends a telephone number to which future coming calls should be forwarded, as indicated by the appropriate forwarding information accessed.

Alternatively, a cradle with wireless telephone access may place a call to the mobile service provider, identify the cellular telephone for which forwarding is to be initiated, send a function code to initiate call forwarding, and send a telephone number to which future coming calls should be forwarded, as indicated by the appropriate forwarding information accessed.

In another alternative, a cradle with IP-access may send a message to an IP-address associated with the mobile service provider that informs the mobile service provider to initiate call forwarding for an identified cellular telephone to a particular telephone number.

Figure 3:
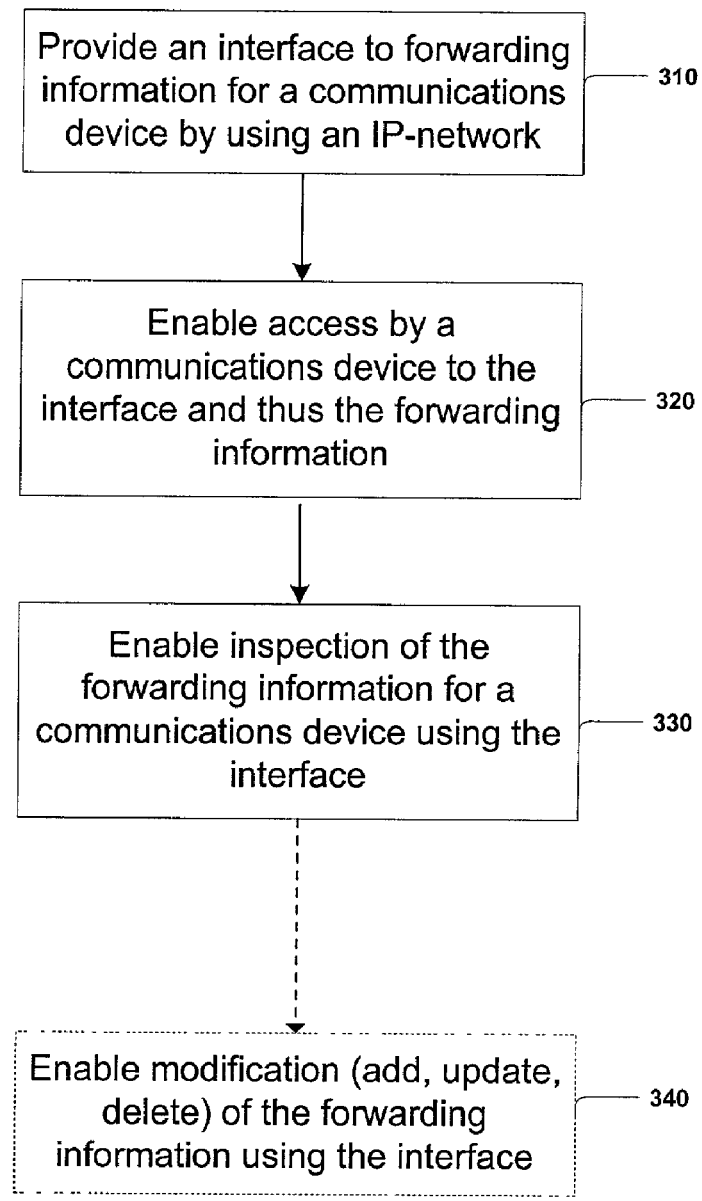
FIG. 3 is a flow chart for handling forwarding information.

Referring to FIG. 3, another aspect of the overall implementation involves handling forwarding information for the mobile communications device to which an incoming communication is directed by accessing an IP network, such as that generally described with respect to item 160 of FIG. 1. The process 300 generally is performed by a mobile communications device capable of accessing an IP network, such as a general-purpose computer 170, PDA 114, or a portable personal communicator 116 as described previously with reference to FIG. 1.

The process 300 to handle forwarding information communicated to the mobile service provider in response to a detected change in physical location of the mobile communications device includes using an IP network interface to provide access to forwarding information for a mobile communications device (step 310). Forwarding information for a mobile communications device may include forwarding information identified for a particular cradle. A particular cradle may be identifiable, enabling incoming communications to the mobile communications device to be forwarded to an identified communications device based upon placement in a particular cradle.

Using an IP network interface to provide access to forwarding information for a mobile communications device may allow forwarding information to be stored at the mobile service provider, effectively, decreasing the processing requirements for the mobile communications device or associated cradle, allowing the mobile service provider greater control over the interface used to handle and manipulate forwarding information, and allowing the user access to this functionality without a separate application program on the mobile communications device or requiring specialized application programs to be loaded or maintained on any other computing device used to enable access to the forwarding information at the mobile service provider. Leveraging such an IP network interface and identifiers associated with one or more cradles, the forwarding information for one or more particular cradles may be accessed and/or modified.

The IP network generally has been described above with respect to item 160 of FIG. 1. The process 300 enables access to forwarding information for a mobile communications device using an interface (step 320) and enables inspection of the forwarding information for a mobile communications device using the interface (step 330).

The process 300 also may include enabling modification of the forwarding information using the interface (step 340). The modification may include one or more of adding, deleting, or updating forwarding information.

Some implementations may route incoming telephone calls to an specified IP-address, for example, by using Voice-over-IP protocols and techniques.

Implementations may include a method or process, an apparatus or system, or computer software on a computer medium. Further implementations are within the scope of the following claims.

What is claimed is:

1. A method for communicating forwarding information, the method comprising:
    detecting a physical location change for a first mobile communications device wherein the detected physical location change is one of placement of the first mobile communications device in a cradle associated with the first mobile communications device or removal of the first mobile communications device from the cradle associated with the first mobile communications device wherein the detected physical location change is one of placement of the first mobile communications device in a cradle associated with the first mobile communications device or removal of the first mobile communications device from the cradle associated with the first mobile communications device;
    based on a detected placement of the first mobile communications device in the cradle associated with the first mobile communications device, initiating a forwarding process to forward one or more incoming communications directed to the first mobile communications device to a second communications device, wherein the forwarding process is performed by the cradle associated with the first mobile communications device; and
    based on a detected removal of the first mobile communications device from the cradle associated with the first mobile communications device, initiating a cancelling process to cancel forwarding of one or more incoming communications directed to the first mobile communications device, wherein the canceling process is performed by the cradle associated with the first mobile communications device.

2. The method of claim 1 wherein the first mobile communications device detects the physical location change.

3. The method of claim 1 wherein the cradle associated with the first mobile communications device detects the physical location change.

4. The method of claim 1 wherein the first communication device is a cellular telephone.

5. The method of claim 1 further comprising accessing forwarding information for the first mobile communications device.

6. The method of claim 5 wherein accessing forwarding information comprises accessing forwarding information from the first mobile communications device.

7. The method of claim 1 wherein:
    initiating the forwarding process to forward the one or more incoming communications is performed by the cradle associated with the first mobile communications device using an Internet Protocol network; and
    initiating the cancelling process to cancel the forwarding of the one or more incoming communications is performed by the cradle associated with the first mobile communications device using the Internet Protocol network.

8. The method of claim 1 wherein:
    initiating the forwarding process to forward the one or more incoming communications is performed by the cradle associated with the first mobile communications device using a wireless communication pathway; and
    initiating the cancelling process to cancel the forwarding of the one or more incoming communications is performed by the cradle associated with the first mobile communications device using the wireless communication pathway.

9. A computer program stored on a computer readable medium or a propagated signal for determining whether to forward a received communication, the computer program comprising:
    a physical location code segment for detecting a physical location change for a first mobile communications device wherein the detected physical location change is one of placement of the first mobile communications device in a cradle associated with the first mobile communications device or removal of the first mobile communications device from the cradle associated with the first mobile communications device;
    a forwarding code segment for initiating a process to forward one or more incoming communications directed to the first mobile communications device to a second mobile communications device based on a detected placement of the first mobile communications device in the cradle associated with the first mobile communications device; and
    a canceling code segment for initiating a process to cancel forwarding of one or more incoming communications directed to the first mobile communications device based on a detected removal of the first mobile communications device from the cradle associated with the first mobile communications device, wherein:

the forwarding code segment is used by the cradle associated with the first mobile communications device, and the canceling code segment used by the first mobile communications device uses the cradle associated with the first mobile communications device.

10. The medium of claim 9 wherein the physical location code segment comprises a code segment for the first communication device to detect the physical location change.

11. The medium of claim 9 wherein the physical location code segment comprises a code segment for the cradle associated with the first mobile communications device to detect the physical location change.

12. The medium of claim 9 wherein the physical location code segment comprises a code segment for detecting the physical location change for a cellular telephone.

13. The medium of claim 9 further comprising a code segment for accessing forwarding information for the first mobile communications device.

14. The method of claim 13 wherein the code segment for accessing forwarding information comprises a code segment for accessing forwarding information from the first mobile communications device.

15. The medium of claim 9 wherein:

the forwarding code segment used by the cradle associated with the first mobile communications device uses an Internet Protocol network; and the canceling code segment used by the first mobile communications device uses the cradle associated with the first mobile communications device uses the Internet Protocol network.

16. The medium of claim 9 wherein:

the forwarding code segment used by the cradle associated with the first mobile communications device uses a wireless communication pathway; and the canceling code segment used by the first mobile communications device uses the cradle associated with the first mobile communications device the wireless communication pathway.

17. An apparatus including a device structured and arranged to for determining whether to forward a received communication, the apparatus being configured to:

detect a physical location change for a first mobile communications device wherein the detected physical location change is one of placement of the first mobile communications device in a cradle associated with the first mobile communications device or removal of the first mobile communications device from the cradle associated with the first mobile communications device;

based on a detected placement of the first mobile communications device in the cradle associated with the first mobile communications device, initiate a process to forward one or more incoming communications directed to the first mobile communications device to a second mobile communications device; and initiate a process to cancel forwarding of one or more incoming communications directed to the first mobile communications device based on a detected removal of the first mobile communications device from the cradle associated with the first mobile communications device, wherein:

initiating the forwarding process to forward the one or more incoming communications is performed by the cradle associated with the first mobile communications device, and initiating the cancelling process to cancel the forwarding of the one or more incoming communications is performed by the cradle associated with the first mobile communications device.

18. The apparatus of claim 17 wherein the first mobile communications device detects the physical location change.

19. The apparatus of claim 17 wherein the cradle associated with the first mobile communications device detects the physical location change.

20. The apparatus of claim 17 wherein the first communication device is a cellular telephone.

21. The apparatus of claim 17 wherein the processor is further configured to access forwarding information for the first mobile communications device.

22. The apparatus of claim 21 wherein the processor is configured to access forwarding information from the first mobile communications device.

23. The apparatus of claim 19 wherein:

initiating the forwarding process to forward the one or more incoming communications is performed by the cradle associated with the first mobile communications device using an Internet Protocol network; and initiating the cancelling process to cancel the forwarding of the one or more incoming communications is performed by the cradle associated with the first mobile communications device using the Internet Protocol network.

24. The apparatus of claim 19 wherein:

initiating the forwarding process to forward the one or more incoming communications is performed by the cradle associated with the first mobile communications device using a wireless communication pathway; and initiating the cancelling process to cancel the forwarding of the one or more incoming communications is performed by the cradle associated with the first mobile communications device using the wireless communication pathway.

* * * * *